United States Patent
Hosoi et al.

[11] Patent Number: 6,119,545
[45] Date of Patent: Sep. 19, 2000

[54] STEERING WHEEL AND METHOD OF MANUFACTURE, AND HORN SWITCH

[75] Inventors: Akio Hosoi, Komaki; Atsushi Nagata, Inazawa; Katsunobu Sakane, Ichinomiya, all of Japan

[73] Assignee: Toyoda Gosei Co., Ltd., Aichi-ken, Japan

[21] Appl. No.: 08/997,331

[22] Filed: Dec. 23, 1997

[30] Foreign Application Priority Data

Dec. 24, 1996 [JP] Japan ................................. 8-343784
Mar. 13, 1997 [JP] Japan ................................. 9-059472
Mar. 13, 1997 [JP] Japan ................................. 9-059476

[51] Int. Cl.$^7$ ........................................ B62D 1/10
[52] U.S. Cl. ........................................ 74/552; 280/731
[58] Field of Search ........................ 74/552; 280/728.2, 280/731; 29/894.1

[56] References Cited

U.S. PATENT DOCUMENTS

| | | | |
|---|---|---|---|
| 5,716,068 | 2/1998 | Sahara et al. | 280/728.2 X |
| 5,765,865 | 6/1998 | Nagata et al. | 280/728.2 X |
| 5,768,948 | 6/1998 | Hosoi et al. | 74/552 |
| 5,924,725 | 7/1999 | Kozyreff et al. | 280/731 |

FOREIGN PATENT DOCUMENTS 2-133955  11/1990  Japan.

*Primary Examiner*—Mary Ann Battista
*Attorney, Agent, or Firm*—Pillsbury Madison & Sutro LLP

[57] ABSTRACT

A steering wheel has a ring core embedded in a gripping ring, a plurality of spokes extending in the ring core, a plurality of spoke cores embedded in the associated spokes. A connecting member connects at least two spoke cores together. A coupling mechanism couples the boss to the connecting member. The coupling mechanism includes an cylindrical support formed on the connecting member, and a pair of spaced ribs formed on the boss for holding the support. The connecting member fits between the ribs when the connecting member is coupled to the boss. A bolt fastens the support to the ribs.

15 Claims, 13 Drawing Sheets

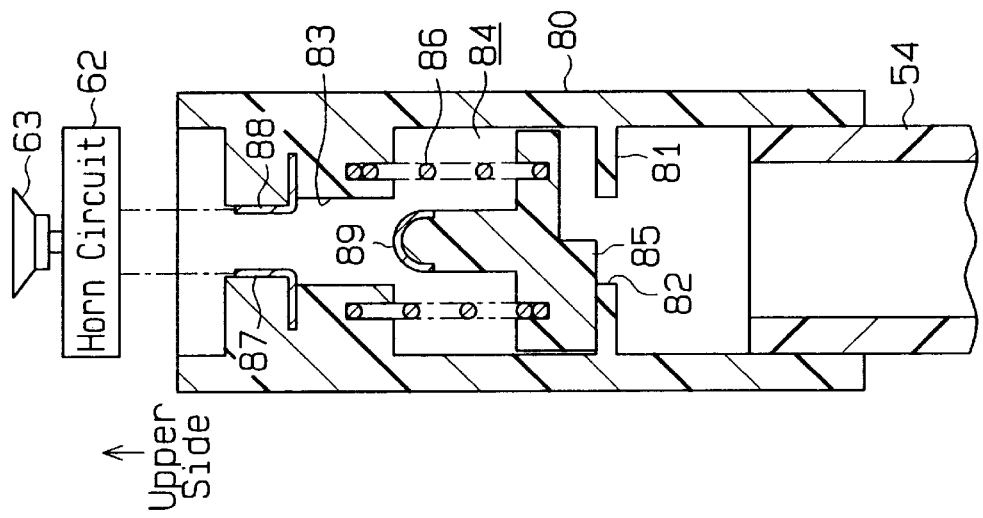
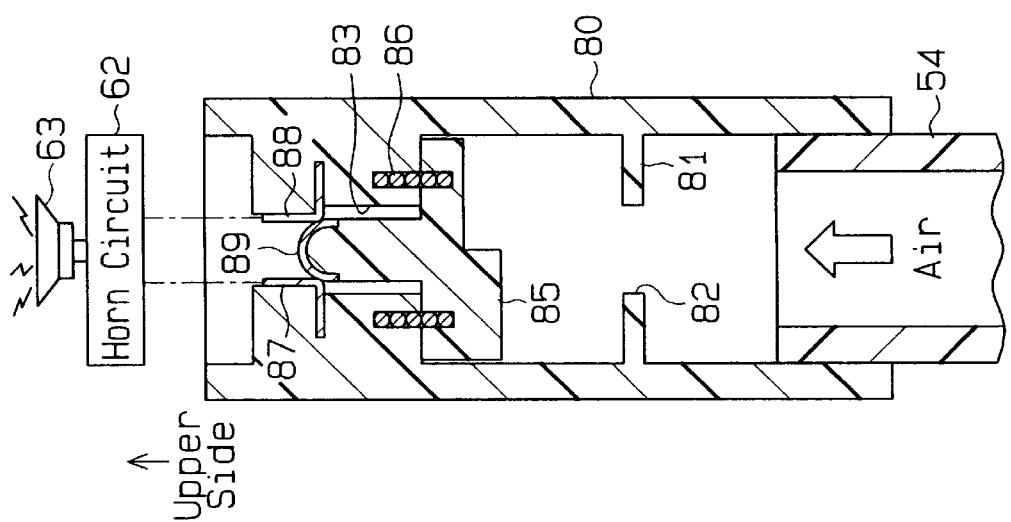

STEERING WHEEL AND METHOD OF MANUFACTURE, AND HORN SWITCH

BACKGROUND OF THE INVENTION

The present invention relates to steering wheels for vehicles, and more particularly to steering wheels that are formed integrally with a pads and a ring cover.

A typical steering wheel has an annular gripping ring, a pad located at the center of the ring, and spokes extending from the ring toward the center of the steering wheel. The ring includes a metal ring core and a ring cover, which covers the ring core. The spokes include metal spoke cores and a spoke cover, which covers the spoke cores. The spoke cores are connected to a boss, which is located below the pad. The boss couples the steering wheel to a steering shaft. In general, the boss is mounted on the distal end of the steering shaft by a fastener such as a bolt.

An air bag device and other devices are mounted on the steering wheel after the spoke cores and the boss are secured to the steering shaft. The pad is then mounted over the air bag device.

Steering wheels having a cover and a pad that are formed integrally (see Japanese Unexamined Utility Model Publication No. 2-133955) have been proposed. The integrally formed pad and cover improves the appearance of the steering wheel.

Since the pad and the cover are formed integrally, the steering wheel has no opening above the boss. Therefore, the spoke cores and the boss are separately assembled to the steering shaft. Specifically, the boss is secured to the steering shaft. Then, spoke cores, to which an integrally formed pad and cover are attached, are secured to the boss.

However, coupling the spoke cores to the boss causes the following problems. The spoke cores are secured to the boss by two bolts, which are lateral with respect to the steering shaft, at right and left sides of the boss. When securing the spoke cores to the boss, a certain accuracy is required in the position of the spoke cores in relation to the boss. However, the spoke cores are sometimes secured to the boss without the required position accuracy. That is, the position of the cores sometimes deviates from the required position with respect to the boss. Further, the dimensional accuracy of the part of the spoke cores fastened to the boss differs between products. This may permit causes the spoke cores to move relative to the boss.

In a typical steering wheel, the pad is pressed for activating a horn. In a steering wheel having an air bag device, a horn switch mechanism is located between the air bag and the pad. Recently, a sheet-like horn switch such as membrane switch has been used, which provides enough room for an air bag in the steering wheel.

The membrane switch constitutes a part of a horn switch circuit and includes upper and lower thin metal plates facing each other. The upper plate is located directly below the pad and the lower plate is located directly above the air bag. Insulating spacers are located between the upper and lower plates for defining a space between the plates. Normally, the spacers separate the plates from each other. Projections are formed on a surface of the upper plate. A back board is located on the back of the lower plates. The back board improves the rigidity of the lower plate.

When the pad is pressed, the projections on the upper plate are also pressed. This deforms the upper plate and causes the upper plate to contact the lower plate. Accordingly, the horn switch circuit is closed and the horn is activated.

However, the prior art steering wheels have the following drawbacks.

(1) Thin metal plates in membrane switches are easily deformed by temperature changes. The deformation of the plates may cause the plates to contact each other thereby activating the horn even if the pad is not pressed. In other cases, deformation of the plates results in the pad having to be pressed harder in order to activate the horn.

(2) Since a membrane switch includes several parts (metal plates, spacers located between the metal plates, a back board), the assembly of the switch is burdensome. Further, the assembly of the switch requires high accuracy to prevent erroneous operations of the switch. This raises the manufacturing cost of the steering wheel.

SUMMARY OF THE INVENTION

Accordingly, it is an objective of the present invention to provide a steering wheel that improves its assembly accuracy.

Another objective of the present invention is to provide a steering wheel horn switch that is inexpensive and has high reliability.

To achieve the above objective, the present invention provides a coupler for coupling a steering wheel to a steering shaft of a vehicle, the coupler comprising: an inner coupling member, wherein the inner coupling member is connected to one of the steering shaft and the steering wheel; an outer coupling member, wherein the outer coupling member is connected to the other of the steering wheel and the steering shaft; a support formed on the inner coupling member, wherein the support has a pair of opposite ends; a pair of spaced ribs formed on the outer coupling member for holding the support, wherein the support fits between the ribs and each end of the support engages one of the ribs when the coupling mechanism is coupled; and a fastener for fastening the support to the ribs.

The present invention further provides a steering wheel mounted on a steering shaft with a boss plate, the steering wheel having a gripping ring for manually turning the steering shaft, the steering wheel comprising: a ring core embedded in the gripping ring; a plurality of spokes extending in the ring core; a plurality of spoke cores embedded in the associated spokes; a connecting member for connecting at least two spoke cores together; a cover for covering the ring core and the spoke cores; a pad positioned substantially at the center of the gripping; and a coupling mechanism for coupling the boss plate to the connecting member, the coupling mechanism including an inner coupling member and an outer coupling member, wherein the inner coupling member is fixed to one of the boss and the connecting member, and the outer coupling member is fixed to the other; a pair of spaced ribs formed on the outer coupling member for holding the inner coupling member, wherein the inner coupling member fits between the ribs when the coupling mechanism is coupled; and a fastener for fastening the inner coupling member to the ribs of the outer coupling member.

The present invention provides a steering wheel mounted on a steering shaft with a boss plate, the steering wheel having a gripping ring for manually turning the steering shaft, the steering wheel comprising: a ring core embedded in the gripping ring; a plurality of spokes extending in the ring core; a plurality of spoke cores embedded in the associated spokes; a connecting member for connecting at least two spoke cores together; a cover for covering the ring core and the spoke cores; a pad positioned substantially at the center of the gripping ring; and a coupling mechanism for coupling the boss plate to the connecting member, the coupling mechanism including an first coupling member and a second coupling member, wherein the first coupling member is fixed to one of the boss and the connecting member, and the second coupling member is fixed to the other, and wherein the first and second coupling members are mated to couple the steering wheel to the boss; a protrusion formed on the first coupling member; a receptacle formed on the second coupling member to receive the protrusion when the coupling mechanism is coupled to accurately position the first coupling member in a fixed relationship with respect to the second coupling member.

The present invention further provides a horn switch for activating horn, the switch being built into a steering wheel, the horn switch comprising: a pad for receiving a force from an operator, wherein a force applied to the pad activates the horn, and wherein the pad deforms when the pad is pressed; a pressure supply device for supplying air to a predetermined location in accordance with the deformation of the pad; a movable body located adjacent to the predetermined location for moving in response to air supplied by the pressure supply device; and a switch for actuating the horn based on the movement of the movable body.

The present invention further provides a method for manufacturing a steering wheel having gripping ring and a coupling member connected to the gripping ring, the method comprising the steps of; positioning a cylindrical collar in a mold; casting metal around the collar in the mold for forming the coupling member at a location that is substantially at the center of the gripping ring; and solidifying the melted metal in the mold such that the collar is embedded in the coupling member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 15(a) is a partial cross-sectional view illustrating a switch of a horn circuit according to the fourth embodiment of the present invention; and FIG. 15(b) is a partial cross-sectional view illustrating the switch of FIG. 15(a) when the horn is activated.

DETAILED DESCRIPTION OF THE PREFERRED EMBODIMENTS

Figure 1:
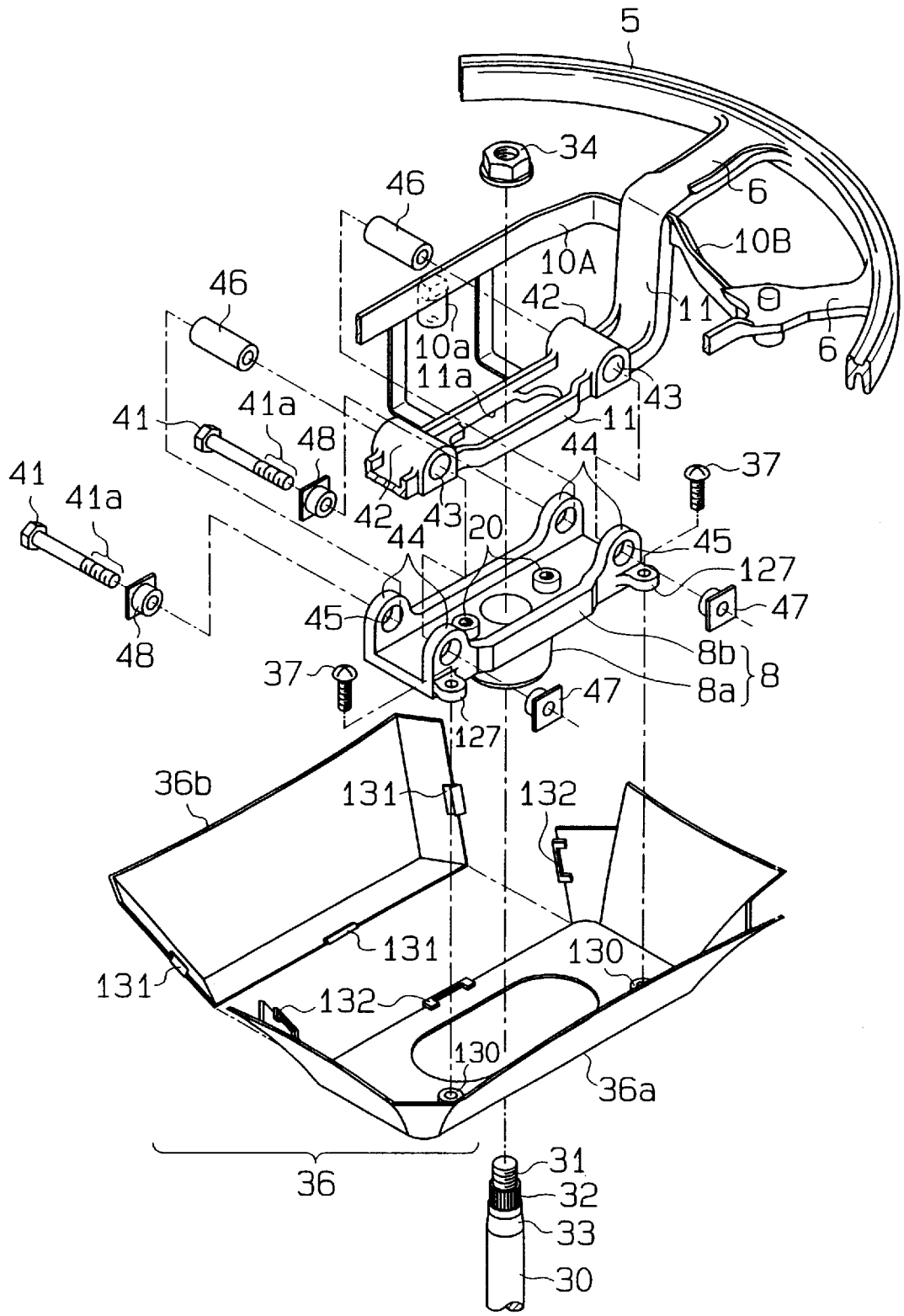
FIG. 1 is an exploded perspective view illustrating a steering shaft, a boss and a steering wheel according to a first embodiment of the present invention.

In the drawings, like numerals are used to designate like elements throughout.

A first embodiment of a steering wheel according to the present invention will hereafter be described with reference to the drawings.

Figure 2:
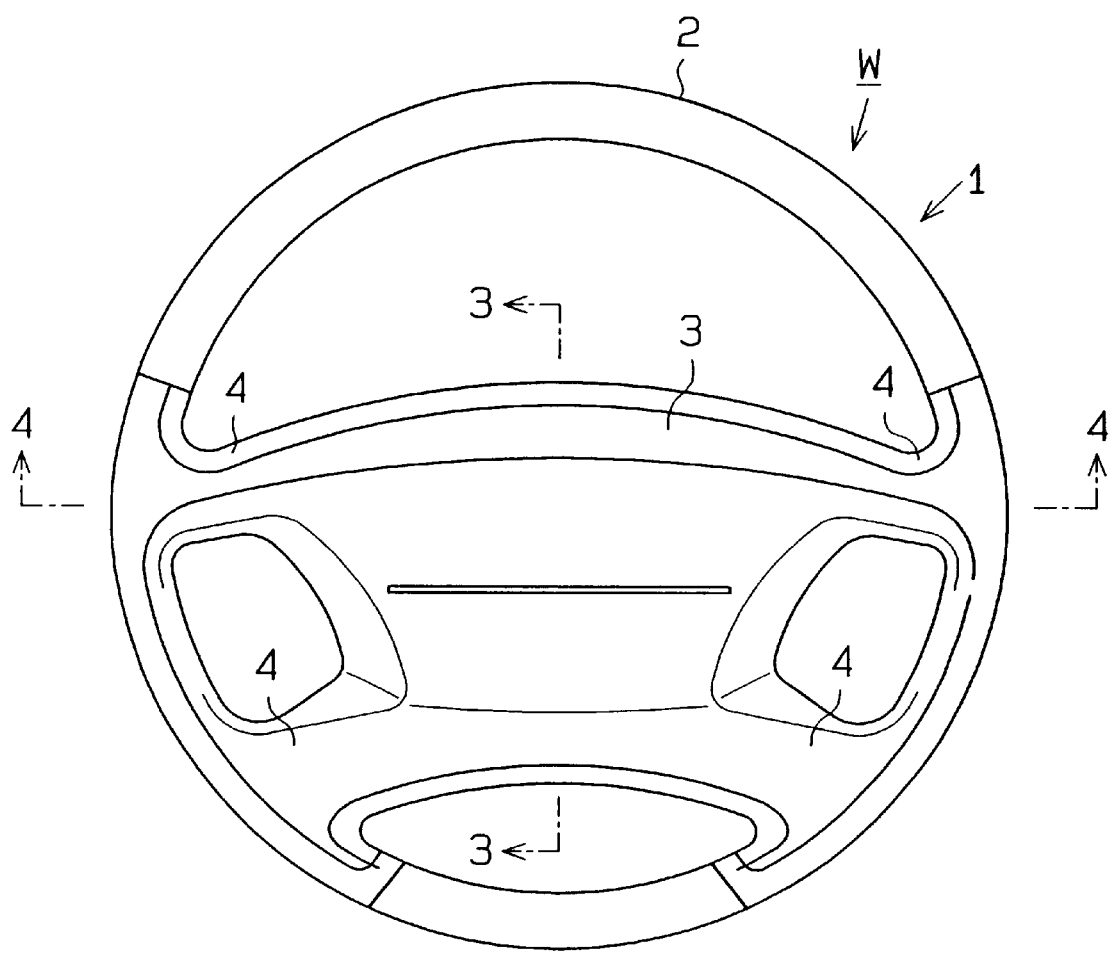
FIG. 2 is a plan view illustrating a steering wheel.
Figure 3:
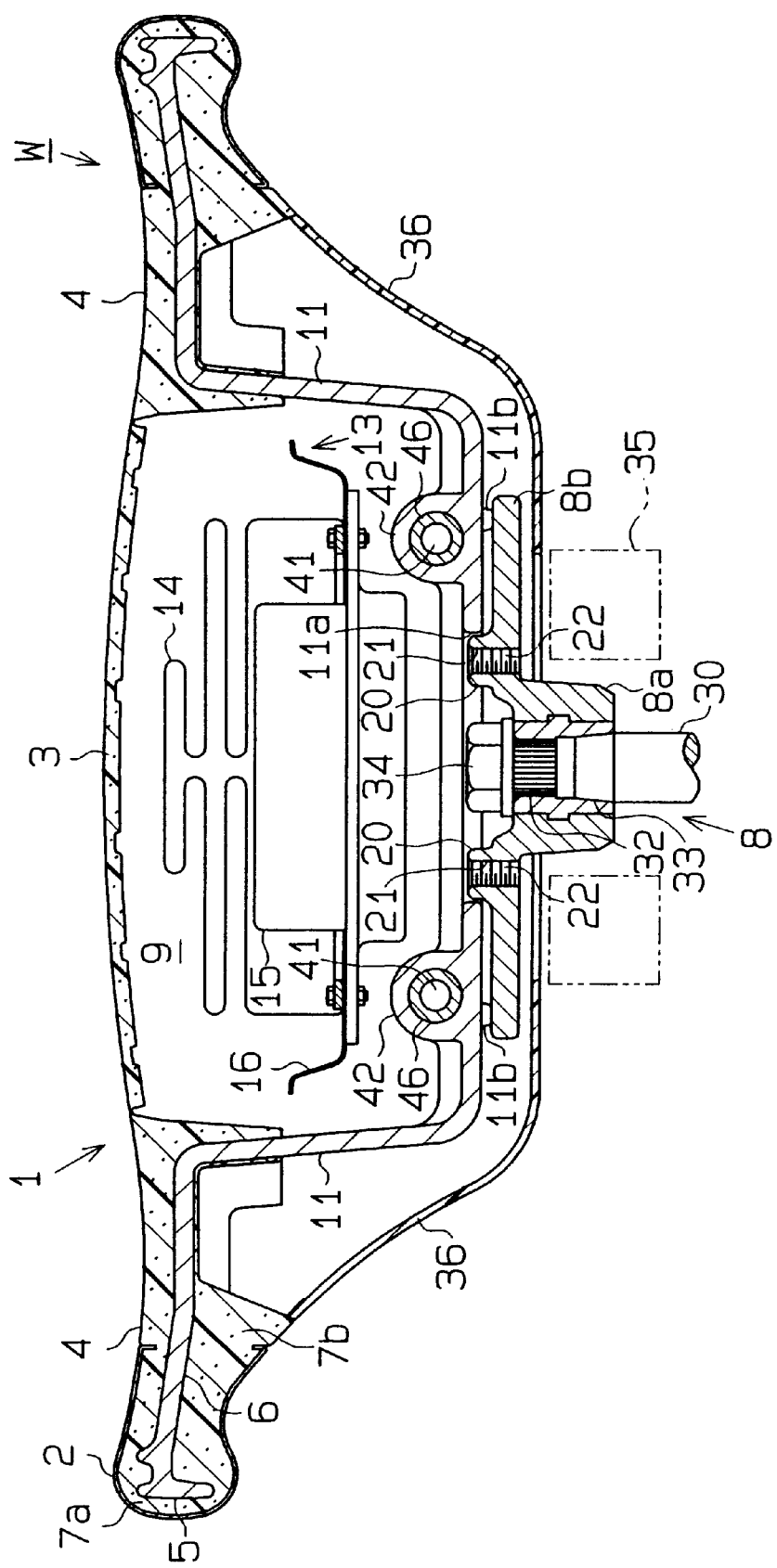
FIG. 3 is a cross-sectional view taken along line 3—3 of FIG. 2.
Figure 5:
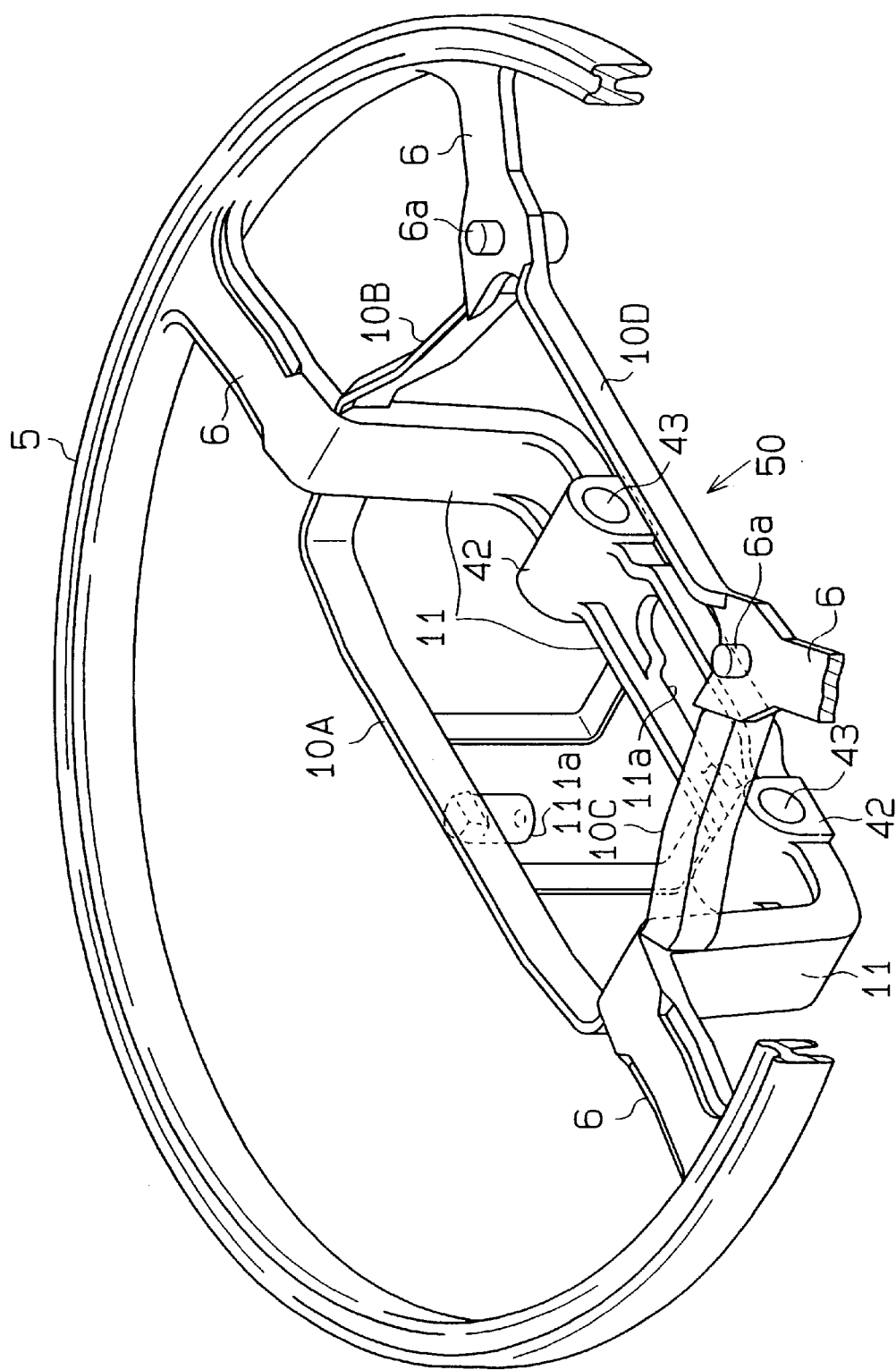
FIG. 5 is a partial perspective view illustrating cores of a steering wheel.

As shown in FIG. 2, a body 1 of a steering wheel W includes an annular gripping ring 2, a pad 3 arranged in the center of the ring 2, and four spokes 4 connecting the ring 2 with the pad 3. As shown in FIG. 3, the ring 2 includes a metal ring core 5, which is die-cast from a light metal such as an aluminum alloy, and a cover 7a, which covers the ring core 5. Each spoke 4 includes a metal spoke core 6, which is die-cast from a light metal such as an aluminum alloy, and a cover 7b, which covers the spoke core 6. The covers 7a, 7b and the pad 3 are formed integrally from a soft synthetic resin such as polyurethane foam. As shown in FIG. 5, adjacent spoke cores 6 are connected by coupling cores 10A, 10B, 10C and 10D.

Figure 4:
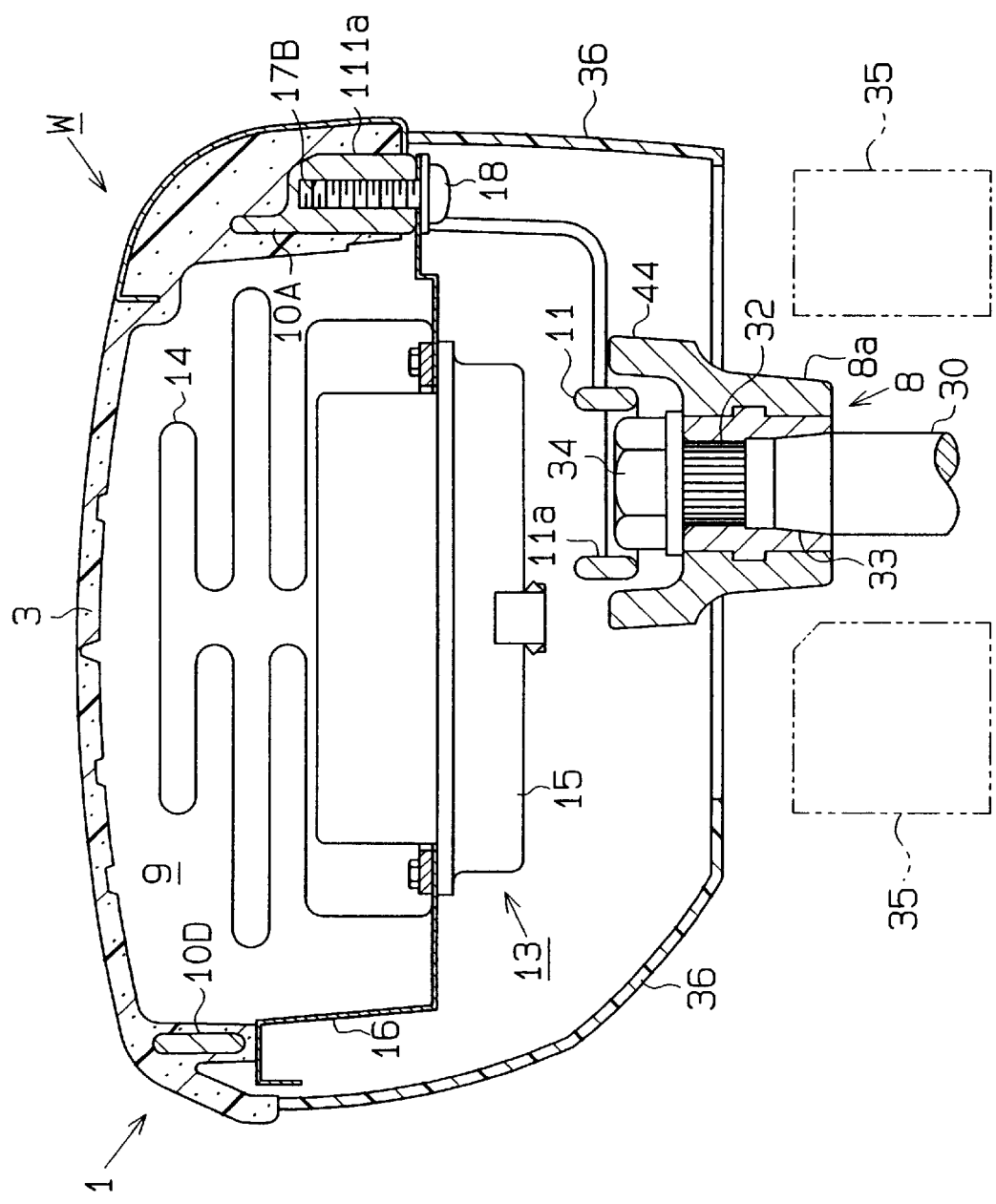
FIG. 4 is a cross-sectional view taken along line 4—4 of FIG. 2.

As shown in FIGS. 3 and 4, a space 9 is defined below the pad 3. A membrane switch, a switch plate (both not shown) and an air bag device 13 are located in the space 9. The membrane switch has a pair of thin plates, which constitute part of a horn switch circuit (not shown). When the pad 3 is pressed, the thin plates contact each other and the horn is activated accordingly.

The air bag device 13 includes an air bag 14, which is retained in a folded state, an inflator 15, which supplies gas to the air bag 14 thereby inflating the bag 14, and a bag holder 16, which securely holds the air bag 14 and the inflator 15. The bag holder 16 is fixed to the coupling core 10A and two of the spoke cores 6. Specifically, a bolt boss 111a having a threaded hole 17B is located on the coupling core 10A and two bolt bosses 6a are formed on the two spoke cores 6 as illustrated in FIGS. 4 and 5. Each bolt boss 6a also has a threaded hole (not shown). The bag holder 16 is fixed to the core 10A and the two spoke cores 6 by screwing bolts 18 into the threaded hole 17B of the bolt boss 111a and into the threaded holes in the bolt bosses 6a.

As shown in FIGS. 3–5, the spoke cores 6 are covered by the cover 7b and extend from the ring core 5 toward the center of the steering wheel W. Two opposed spoke cores 6 extend downwardly and are connected by the connecting member 11, which is located below the pad 3. A substantially oblong hole 11a is formed in the center of the connecting member 11. When securing a boss 8 to a steering shaft 30, a nut 34 is screwed to the distal end of the shaft 30 through the hole 11a. A pair of cylindrical supports 42 are formed on both sides of the hole 11a in the connecting member 11. A bolt hole 43 is formed in each support 42. The bolt holes 43 are parallel to each other. Bolts 41 (see FIG. 3) are inserted into the holes 43 for securing the connecting member 11 to the boss 8.

The boss 8 is located below the connecting member 11 for coupling the steering wheel W to the steering shaft 30. The boss 8 includes a cylindrical portion 8a, at which the boss 8 is secured to the steering shaft 30, and a coupling plate 8b, which is located at one end of the cylindrical portion 8a. The coupling plate 8b is made of aluminum alloy. As shown in FIG. 1, two pairs of ribs 44 are formed on the coupling plate 8b. The ribs 44 are arranged parallel to each other. Each rib 44 has a bushing hole 45 at a position corresponding to the bolt hole 43.

The steering wheel assembly will now be described with reference to FIGS. 1, 3 and 4.

As shown in FIG. 1, a threaded portion 31 is formed at the distal end of the steering shaft 30. A splined portion 32 and a tapered surface 33 are located next to the threaded portion 31 as illustrated in FIGS. 1, 3 and 4. A predetermined number of outer splines (generally about 30) are formed in the splined portion 32. The cylindrical portion 8a of the boss 8 also has inner splines and an inner tapered surface formed in its inner wall. The splines and the tapered surface in the cylindrical portion 8a cooperate with the splined portion 32 and the tapered surface 33 of the steering shaft 30. The boss 8 is fitted to the distal end of the steering shaft 30. A nut 34 is then screwed onto the threaded portion 31 of the shaft 30 for securing the boss 8 to the shaft 30. A spiral cable 35, which is used for supplying electric power to the air bag device 13 and other devices, is arranged about the steering shaft 30. Also, as shown in FIG. 1, a resin lower cover 36 encompasses the boss 8. The lower cover 36 is secured to the coupling plate Bb of the boss 8 by bolts 37.

The assembly formed by the spoke cores 6 and the boss 8, which characterizes of the present invention, will now be described with reference to FIGS. 1 and 7.

Figure 7:
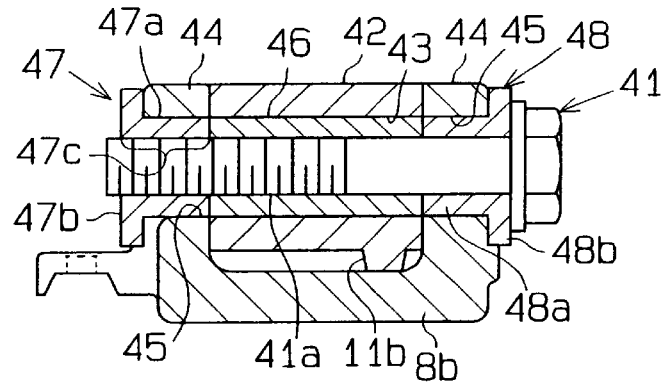
FIG. 7 is an enlarged cross-sectional view illustrating a support of a connecting member, which is fixed to holding ribs.

As shown in FIGS. 1 and 7, a cylindrical collar 46 is press fitted in each bolt hole 43. The collars 46 are made of an iron-based metal and have a predetermined degree of hardness. The length of the collars 46 is equal to the width of the supports 42. Each support 42 is fitted between an aligned pair of the ribs 44 with the bolt holes 43 aligned with the bushing holes 45. As shown in FIG. 7, a projection 11b is formed integrally on the bottom of the connecting member 11. The position the connecting member 11, that is, the position of the spoke cores 6 in relation to the coupling plate 8b of the boss 8 is determined by the contact of the projection 11b with the coupling plate 8b.

Bushings 47, 48 are fitted in bushing holes 45 formed in the ribs 44. Like the collars 46, the bushings 47, 48 are made of an iron-based metal and have a cylinder 47a, 48a and a flange 47b, 48b. The flange 47b, 48b is formed on an end of each bushing 47, 48. The size of the flanges 47b, 48b is larger than the diameter of the cylinders 47a, 48a. The length of the cylinders 47a, 48a is equal to the thickness of the ribs 44. When the bushings 47 are inserted in the bushing holes 45, the flanges 47b, 48b are engaged with the outer surface of the ribs 44. In this manner, the flanges 47b, 48b prevent the cylinder 47a, 48a from being further inserted beyond the thickness of the ribs 44. The bushings 47, which are located on one side of the boss 8, include a threaded portion 47c formed in their inner surface as indicated in FIG. 7.

Figure 6:
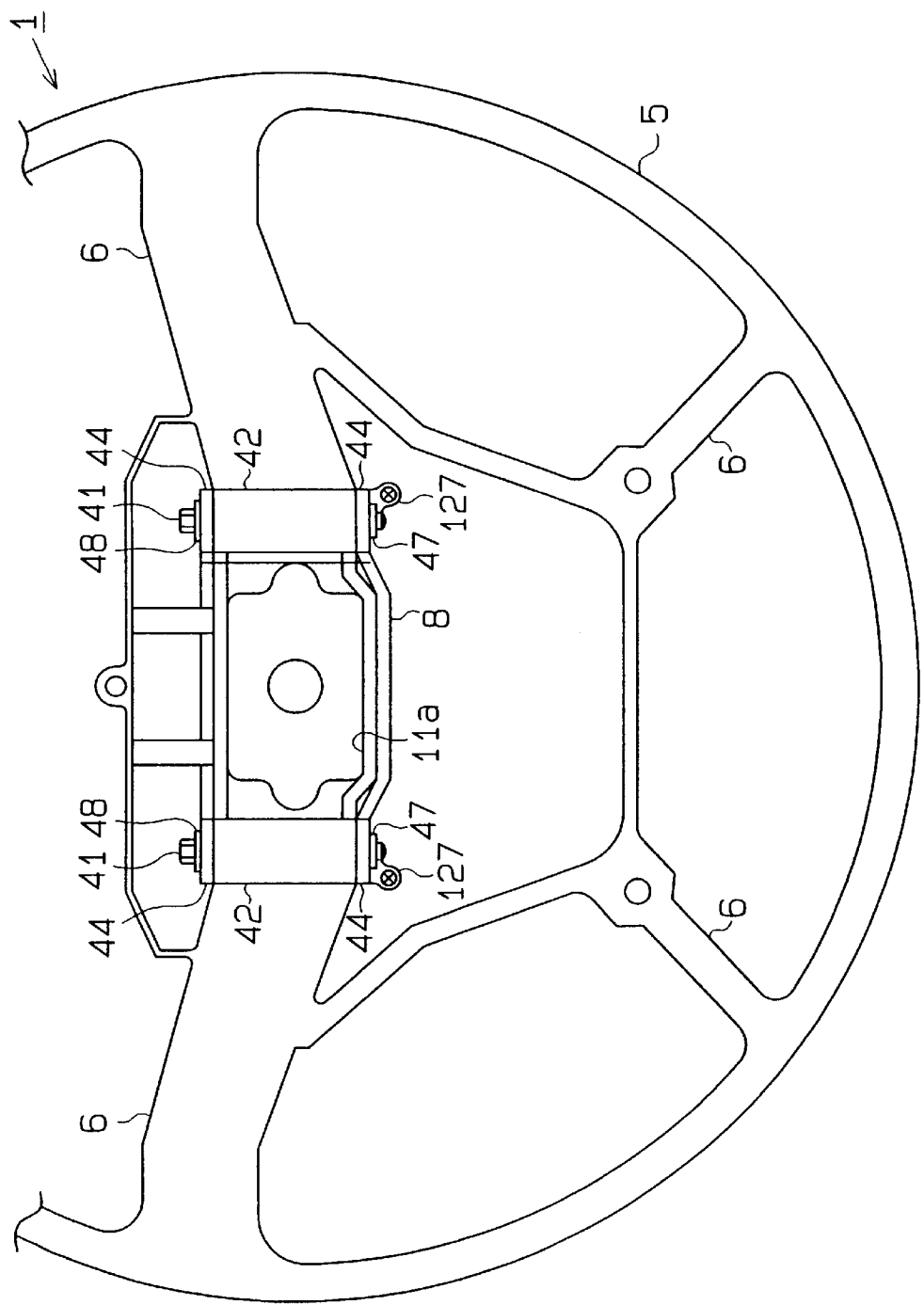
FIG. 6 is a partial plan view illustrating spoke cores secured to a boss.

As shown in FIG. 7, each bolt 41 has a threaded portion 41a. The bolts 41 are inserted from the bushings 48 toward the bushings 47 through the collars 46. The threaded portion 41a of each bolt 41 is screwed in the threaded portion 47c of the corresponding bushings 47. Accordingly, the sides of the supports 42 are tightly pressed between the ribs 44. The connecting member 11, or ultimately, the steering wheel body 1, is secured to the boss 8 as illustrated in FIG. 6.

The assembly of the lower cover 36 will now be described with reference to FIG. 1.

The lower cover 36 includes a first lower cover 36a and a second lower cover 36b. A pair of ribs 127 project from a side of the coupling plate 8b of the boss 8. The cover 36 is secured to the ribs 127. Each rib 127 protrudes laterally and has a bore 128. The bores 128 extend vertically. Two bolt holes 130 are formed in the first lower cover 36a. The inner wall of each hole 130 is threaded. The ribs 127 are secured to the holes 130 by bolts 37. This couples the cover 36 to the boss 8. The second lower cover 36b has hooks 131 protruding toward the first lower cover 36a. The first lower cover 36a has holders 132, each of which corresponds to one of the hooks 131. Engagement of the hooks 131 and the holders 132 secures the second lower cover 36b to the first lower cover 36a. Consequently, the boss 8 is covered with the lower cover 36.

Other characteristics of this embodiment will now be described with reference to FIGS. 1 and 3.

As shown in FIGS. 1 and 3, the coupling plate 8b of the boss 8 has cylindrical protrusions 20 on the steering wheel side. Each protrusion 20 extends toward the air bag 13 and has a puller hole 21 as illustrated in FIG. 3. A thread 22 is formed in the inner wall of each hole 21.

Figure 8:
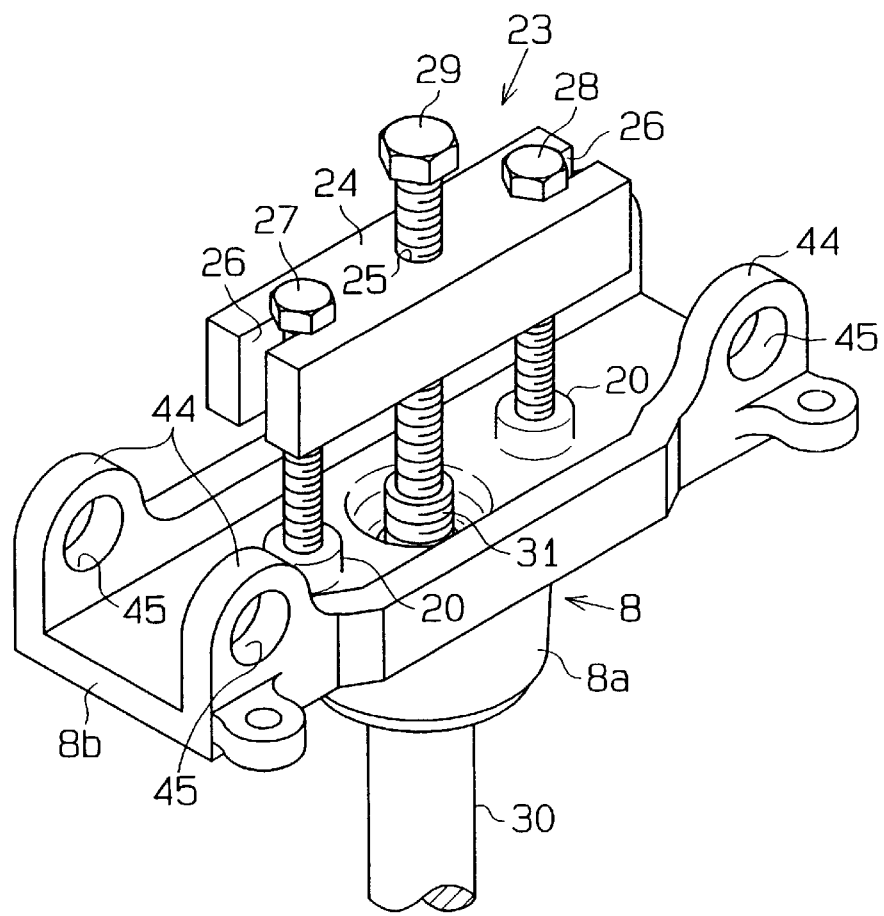
FIG. 8 is a perspective view illustrating method for disengaging a boss from a steering shaft using a puller.

The protrusions 20 are not used during normal operation, but are used for removing the boss 8 from the steering shaft 30 during maintenance or repair. Specifically, a puller 23 illustrated in FIG. 8 is used for removing the boss 8. The puller 23 includes a rectangular body 24. A threaded bolt bore 25 is formed in the center of the body 24. Notches 26 are formed in the ends of the body 24.

When removing the boss 8 from the steering shaft 30, bolts 27, 28 are fitted to the notches 26 of the puller 23.

The bolts 27, 28 are screwed to the threads 22 in the puller holes 21. This firmly fixes the body 24, the boss 8 and the bolts 27, 28 to one another. Thereafter, another bolt 29 is screwed in the bolt bore 25 of the body 24. The distal end of the bolt 29 contacts the distal end (upper end) of the steering shaft 30. Inward rotation of the bolt 29 moves the body 24, the bolts 27, 28 and the boss 8 outward, or away from the shaft 30. Consequently, the boss 8 is removed from the shaft 30.

As illustrated in FIGS. 1 and 5, the location of the hole 11a, which is formed in the connecting member 11, corresponds to the protrusions 20. That is, each end of the hole 11a is formed semicircularly. When the connecting member 11 is placed on the boss 8, the engagement of the protrusions 20 with the semicircular ends of the hole 11a determines the position of the connecting member 11.

Assembly of the steering wheel W to the steering shaft 30 will now be described with reference to FIG. 1.

Firstly, the boss 8 is fitted o the distal end of the steering shaft 30. The splined portion 32 on the shaft 30 is engaged with the serrated portion formed on the inner wall of the cylindrical portion 8a of the boss 8. The nut 34 is then screwed on the threaded portion 31 of the shaft 30 for securing the boss 8 to the shaft 30. Thereafter, the lower cover 36 is secured to the boss 8 to cover the boss 8.

The body 1 of the steering wheel W is previously assembled. Specifically, the air bag 14, the inflator 15 and the bag holder 16 are assembled to manufacture the air bag device 13. The switch plate and the membrane switch are secured to the bag holder 16. Then, the air bag device 13 is inserted in the space 9 through an opening 50, which is defined by the connecting member 11 and the coupling cores 10B, 10C, 10D (see FIG. 5). The bag holder 16 is then secured to the boss 111a of the coupling core 10A and to the boss 6a of the spoke cores 6.

The steering wheel body 1 (including the air bag device 13), which is assembled in the above manner, is mounted on the boss 8. At this stage, the collars 46 have already been inserted in the bolt holes 43 and the bushings 47, 48 have already been inserted in the ribs 44. As shown in FIG. 1 (the air bag device 13 is not illustrated in FIG. 1), the steering wheel body 1 is mounted on the boss 8 such that the connecting member 11 is engaged with the coupling plate 8b of the boss 8. In other words, the supports 42 are fitted between the ribs 44 such that the bolt holes 43 are aligned with the bushing holes 45. At this time, the hole 11a is engaged with the protrusions 20 of the boss B. This determines the position of the connecting member 11 with respect to the boss 8.

Thereafter, the bolts 41 are inserted in the collars 46 and the threaded portions 41a of the bolts 41 are screwed to the threaded portions 47c formed in the bushings 47. The supports 42 are pressurized between the ribs 44 and thus firmly fixed between the ribs 44. In this manner, the connecting member 11, and ultimately the steering wheel body 1, are secured to the boss 8. The assembly of the steering wheel W is completed.

The steering wheel W according to this embodiment has the following advantages.

(1) The supports 42 of the connecting member 11 are pressurized between the ribs 44. This causes the connecting member 11 to be firmly fixed to the boss 8 and also improves the accuracy of the relative position of the connecting member 11 in relation to boss 8. This structure positively and securely holds the spoke core 6 to the boss 8.

(2) The bolts 41 are inserted from the front side of the steering wheel W for coupling the connecting member 11 to the boss 8. This eliminates the need to fasten bolts 41 at positions located directly below the boss 8 (below the steering wheel W) and facilitates the fastening procedure. In particular, the steering wheel W may be coupled to or removed from the steering shaft 30 without interference by the spiral cable 35, which is arranged about the shaft 30. Accordingly, this structure facilitates the mounting of the steering wheel W.

(3) The collars 46, which are made of an iron-based metal, are press fitted in the bolt holes 43 formed in the supports 42 made a of die-cast light metal such as aluminum.

The bolts 41 are inserted in the bolt holes 43 and are secured to the boss 8 by the bushings 47, 48, which are made of an iron-based metal. In other words, the connecting member 11 and the boss 8 are fastened to each other with the iron-based metal parts 46, 47 and 48, which contact each other. Accordingly, plastic deformation of the surfaces of the parts 46, 47 and 48 is reduced. This prevents problems such as fatigue and deformation.

(4) The bushings 47, which have the threaded portion 47c, are fitted in the ribs 44 on one side of the boss 8. This eliminates the need to use other fasteners such as nuts. That is, screwing the bolt 41 into the threaded portion 47c causes the supports 42 to be easily fastened between the ribs 44. This construction is more compact than one employing nuts.

(5) When mounting the connecting member 11 to the boss 8, the protrusions 20 are engaged with the semicircular portions of the hole 11a. This construction dramatically improves the accuracy of positioning the connecting member 11 in relation to the boss 8.

(6) The protrusions 20 are used for removing the boss 8 from the steering shaft 30 as well as for positioning the connecting member 11. Therefore, there is no need for separate structures for removing the boss 8 from the shaft 30 and for positioning the connecting member 11. This simplifies the construction of the steering wheel W and reduces the manufacturing cost.

(7) In general, forming an opening such as the hole 11a in the connecting member 11 reduces the strength and rigidity of the connecting member 11. However, the supports 42, which are formed on the sides of the hole 11a, improve the strength and rigidity of the connecting member 11. Further, the supports 42 are formed at two locations with the steering shaft 30 in between. Therefore, the connecting member 11 is firmly fixed to the boss 8.

A second embodiment of the present invention will now be described with reference to FIGS. 9–11. The differences from the first embodiment will mainly be discussed below.

In the second embodiment, the collars 46 are inserted in the supports 42 in a different manner from the first embodiment. That is, the collars 46 are not press fitted in the bolt holes 43 of the supports 42. However, the collars 46 are embedded in the supports 42 when die-casting the connecting member 11. The forming procedure of the connecting member 11 (the supports 42) having the collars 46 therein will now be described with reference to FIGS. 9 to 11.

Figure 9:
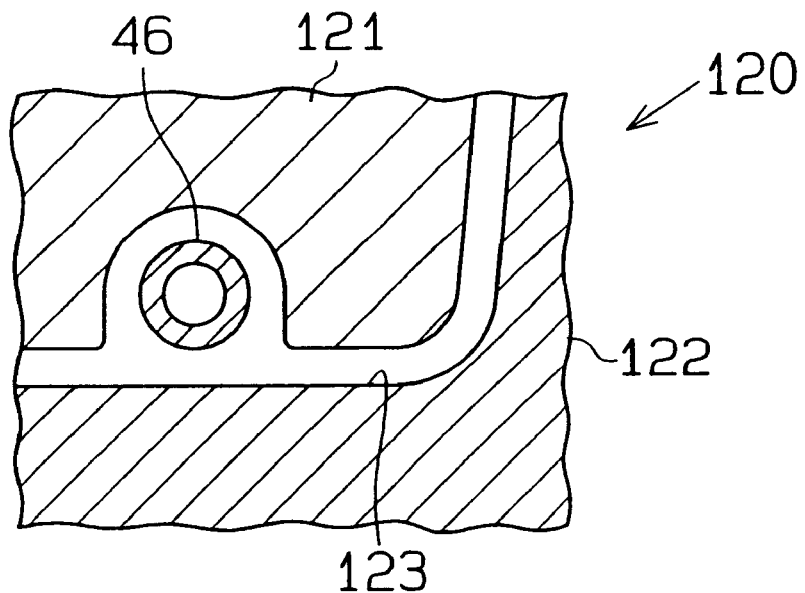
FIG. 9 is a partial cross-sectional view showing a mold used in a die-cast molding according to a second embodiment.
Figure 10:
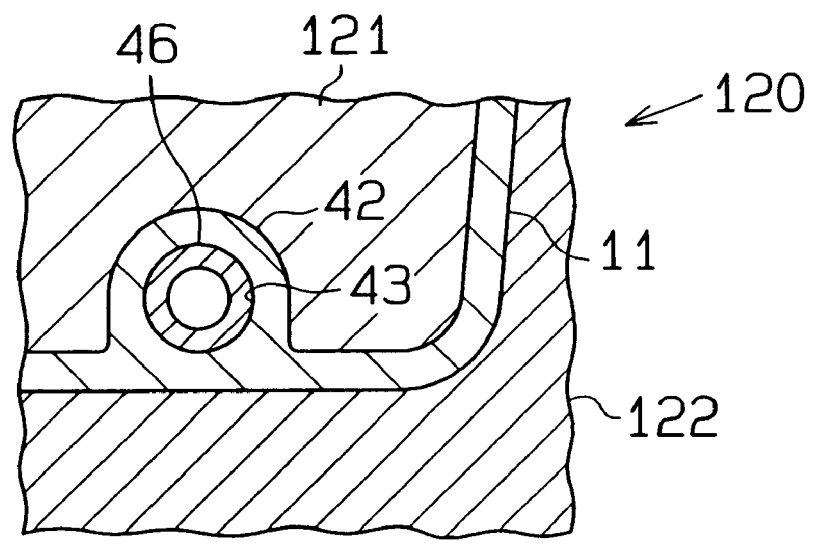
FIG. 10 is a partial cross-sectional view showing the mold of FIG. 9, the cavity of which is charged with aluminum.

As shown in FIG. 9, a die-cast mold 120 includes a first mold member 121 and a second mold member 122. The mold members 121, 122 define a cavity 123 for molding the ring core 5, the spoke cores 6 and the connecting member 11. The illustrated part of the cavity 123 in FIGS. 9 and 10 corresponds to the connecting member 11 (mainly, one of the supports 42 is illustrated).

First, the collar 46 is located at a position corresponding to the support 42. Molten aluminum is then charged into the cavity 123 in the mold 120. The cores including the ring core 5 and the spoke cores 6, and the connecting member 11 are formed when the aluminum cools and hardens.

Figure 11:
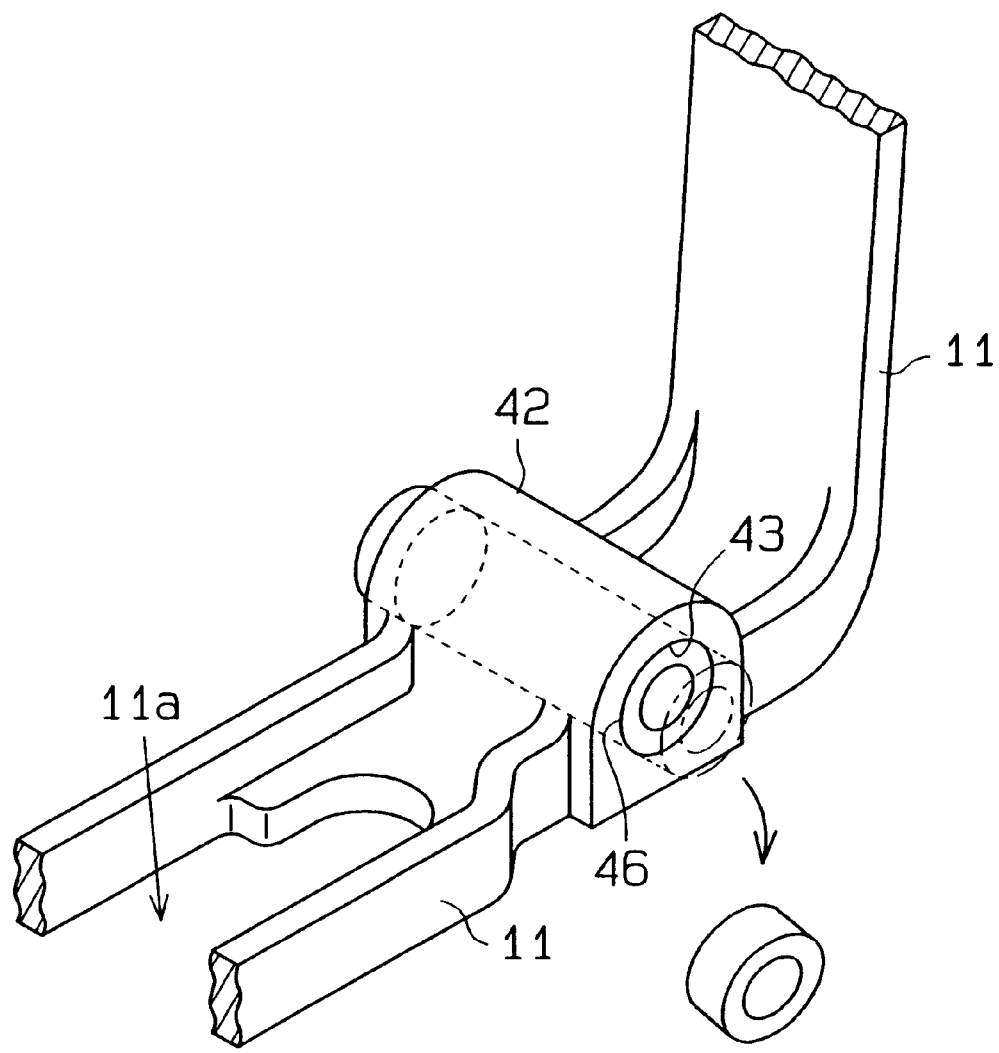
FIG. 11 is a partial perspective view illustrating a machining process of a connecting member and a collar.

Thereafter, parts of the collar 46 protruding from the sides of the supports 42 are removed by machining as illustrated in FIG. 11. At this time, the surfaces of the collars 46 become substantially flush with the sides of the support 42. In this manner, the collars 46 are embedded in the support 42.

This embodiment has the following advantages.

(1) The collars 46, which are located in the bolt holes 43, have a relatively higher rigidity. Therefore, even if the supports 42 (the connecting member 11) are made molded with relatively soft aluminum, the supports 42 have sufficient rigidity.

(2) In this embodiment, the supports 42 are integrally molded with the collars 46. Therefore, when the molding is completed, the thickness of the supports 42 is relatively thin. On the other hand, in other procedures, solid supports are molded first and bolt holes are formed after the molding. In this case, the supports have a greater thickness immediately after the molding, in comparison to this embodiment. If the thickness of a molded material is too large, the material may be porous. Therefore, this embodiment prevents the supports 42 from being porous. This improves the rigidity of the supports 42.

(3) The collars 46 are embedded in the supports 42 when die-casting the supports 42. This eliminates the procedure for press fitting the collars 46 in the bolt holes 43. The productivity of the steering wheel W is thus improved.

(4) After molding the connecting member 11, the molten aluminum is cooled and hardened. This causes the supports 42 to tightly hold the collars 46. Thus, the collars 46 are firmly fixed in the supports 42.

(5) The supports 42 and the collars 46 are machined to be substantially flush with each other. This improves dimensional accuracy of the supports 42, which are tightly held between the ribs 44. This prevents the connecting member 11 from being loosely held by the boss 8.

A third embodiment of the present invention will now be described. The boss 8 is die-cast with an alloy including aluminum and magnesium. Alternatively, the boss 8 may be formed by machining steel.

Figure 12:
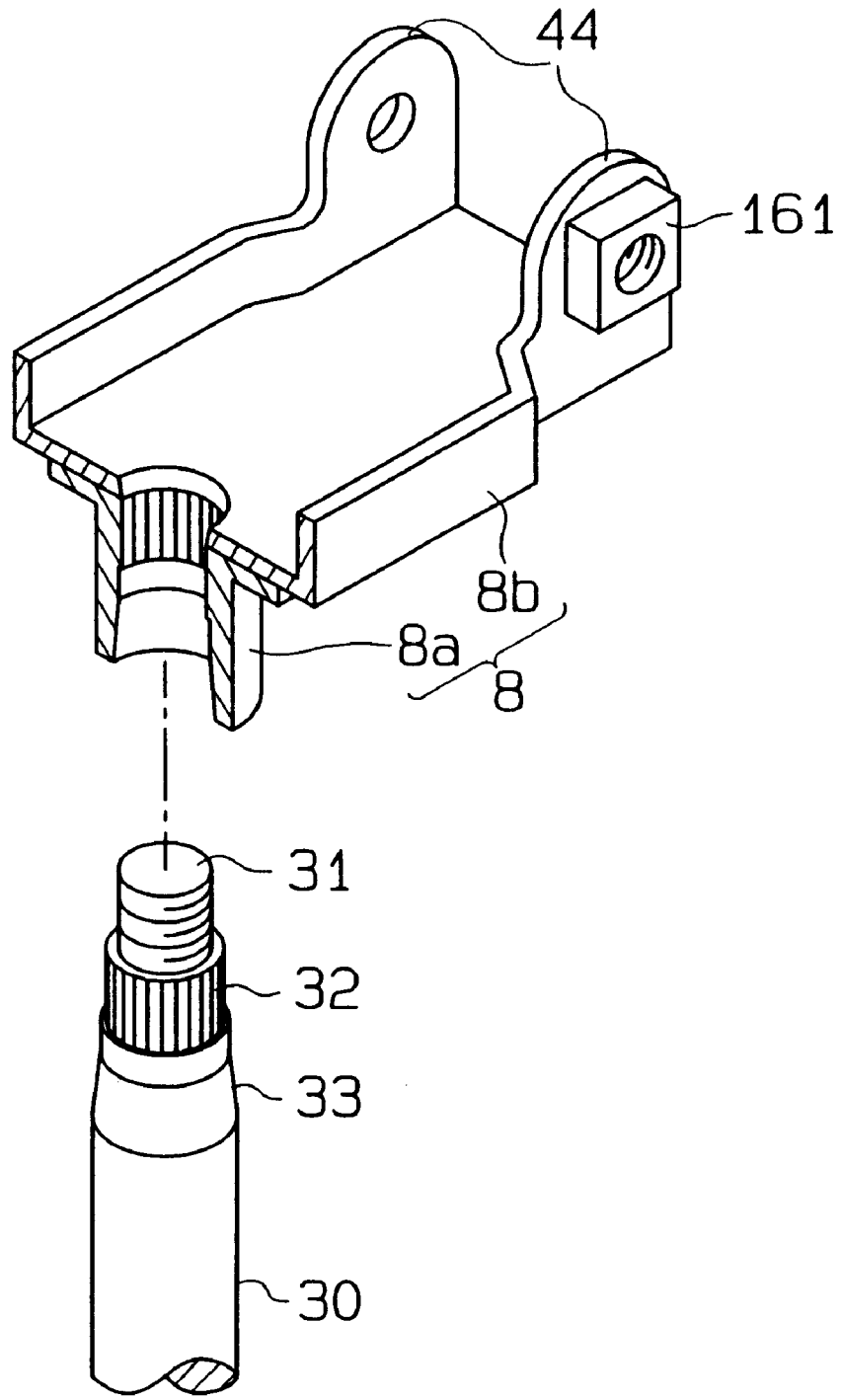
FIG. 12 is a partial perspective view illustrating a boss and a steering shaft according to another embodiment.

As shown in FIG. 12, the boss 8 includes an iron coupling plate 8b and a cylindrical portion 8a, which includes a flange. The cylindrical portion 8a is welded to the coupling plate 8b. Instead of the bushings 47, 48, nuts 161 are welded to the ribs 44. Since the coupling plate 8b is made of iron, which has high rigidity, the thickness of the rib 44 may be increased and the threaded hole may be directly formed in the ribs 44. This construction eliminates the need for the bushings 47, 48 and the nuts 161.

A fourth embodiment of the present invention will now be described with reference to FIGS. 13–15. The differences from the first to third embodiments will mainly be discussed below. A steering wheel W according to this embodiment is characterized by a construction for a horn circuit.

Figure 13:
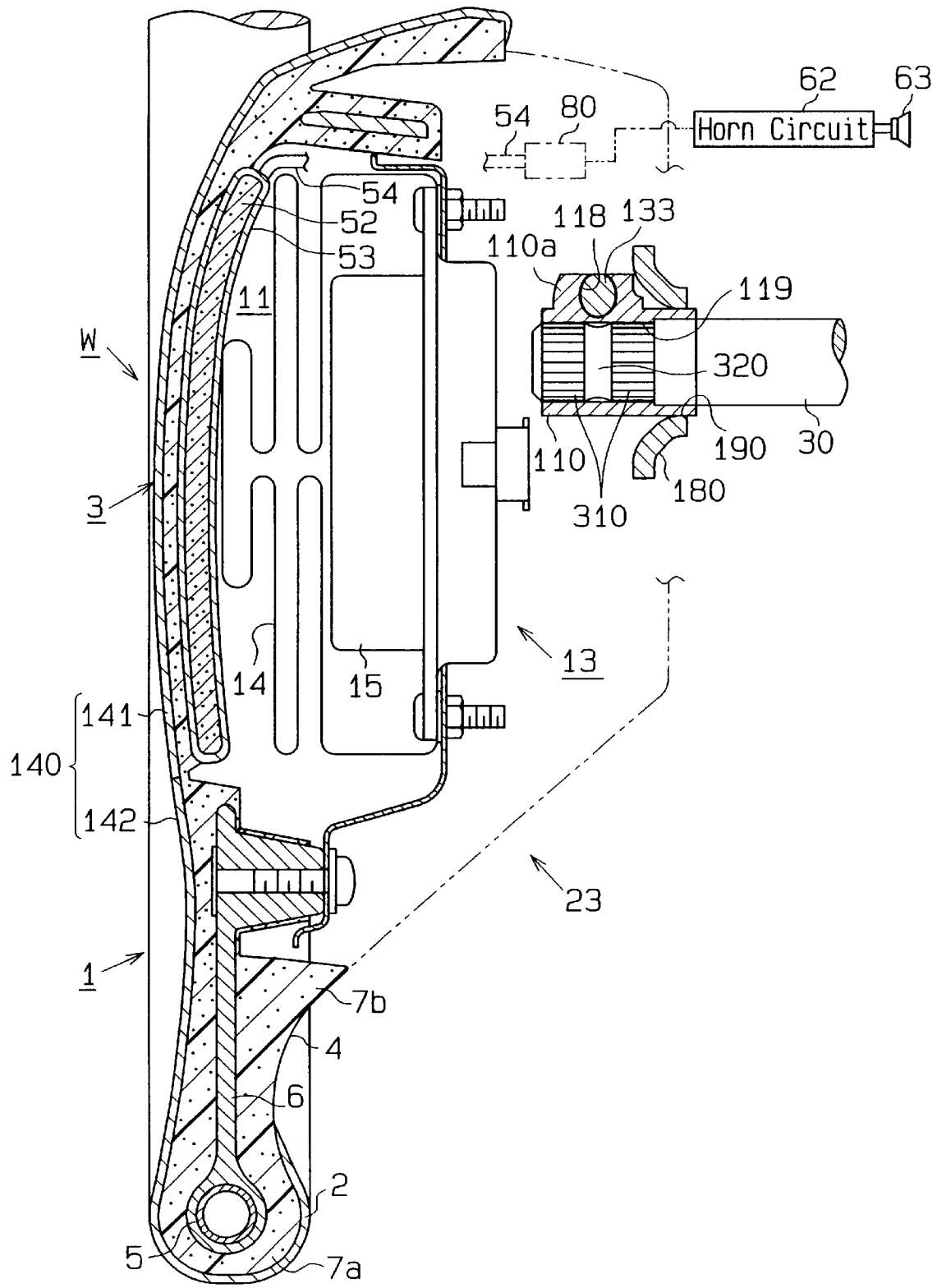
FIG. 13 is a cross sectional view taken along line 13—13 of FIG. 14 illustrating a steering wheel according to a fourth embodiment of the present invention.
Figure 14:
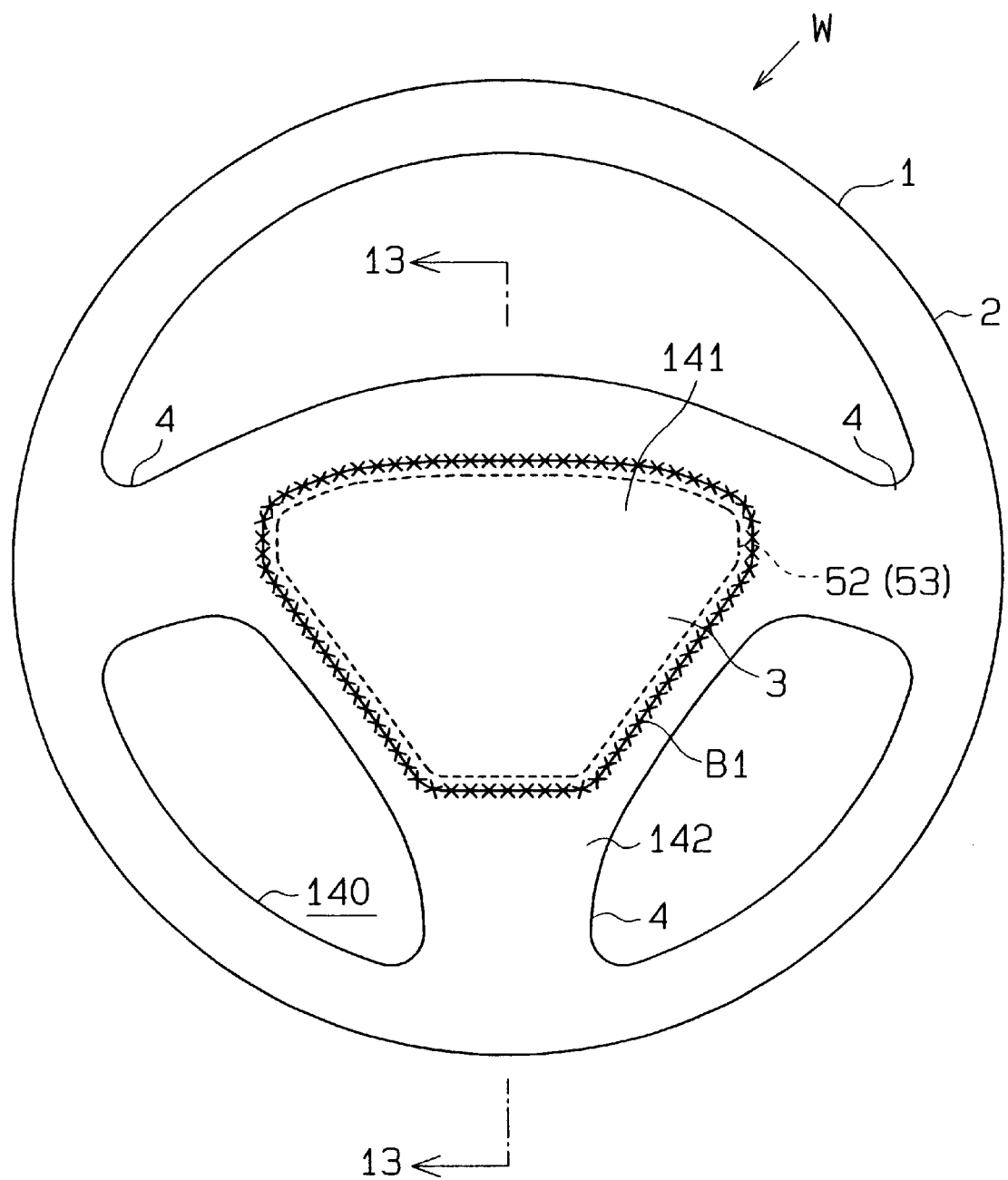
FIG. 14 the plan view illustrating the steering wheel of FIG. 13.

As shown in FIG. 14, the steering wheel W includes three spokes 4. As illustrated in FIGS. 13 and 14, a natural leather sheet 140 is attached to the surface of a body 1 of the wheel W. The natural leather sheet 140 includes a first section 141 and a second section 142. The first section 141 substantially covers the entire surface of the pad 3. The second section 142 is attached on the cover 7a on the gripping ring 2.

As shown in FIG. 13, the steering wheel W of this embodiment includes a boss 180. The boss 180 has a bore 190 formed in its center. A steel adapter 110 is inserted in and welded to the boss 180. The adapter 110 includes a cylindrical portion and a clamp 110a. The clamp 110a has a substantially C-shaped cross section having a pair of ends. A threaded bolt hole 118 is formed in one end of the clamp 110a, and a hole is formed in the other . The steering shaft 30 has a splined portion 310 formed in its distal end. An annular groove 320 is formed in the splined portion 310. The adapter 110 further has a splined portion 119, which corresponds to the splined portion 310 formed on the steering shaft 30. The adapter 110 is attached to the distal end of the steering shaft 30 with the splined portions 119, 310 meshed with each other. A bolt 133 is then screwed in the bolt hole 118 to tighten the clamp 110a. This firmly clamps the boss 180 on the distal end of the steering shaft 30.

This embodiment has the following characteristic features.

As shown in FIG. 13, a sponge 52 is located between the pad 3 and the air bag 14. The sponge 52 is accommodated in a nylon fabric bag 53. One end of the bag 53 is connected to an end of a pipe 54. The other end of the pipe 54 is connected to a casing 80 (FIGS. 15(a) and 15(b)).

As shown in FIGS. 15(a) and 15(b), the casing 80 has a bulkhead 81. A hole 82 is formed in the bulkhead 81. The casing 80 also includes a piston chamber 84 defined therein. A piston 85 is accommodated in the piston chamber 84. A spring 86 extends between the piston 85 and a inner wall of the piston chamber 84. The spring 86 constantly urges the piston 85 toward the bulkhead 81.

The casing 80 also has an air release hole 83, which communicates the piston chamber 84 to the outside. A positive terminal 87 and a negative terminal 88 are located on the wall of the hole 83. The terminals 87, 88 are connected to a horn circuit 62. A conductor 89 is attached to an end of the piston 85 that faces the air release hole 83.

When the pad 3 is pressed, air in the sponge 52 is supplied to the casing 80. The supplied air displaces the piston 85 against the force of the spring 86 away from the bulkhead 81. When contacting the terminals 87, 88, the conductor 89 electrically connects the terminals 87 and 88. This activates the horn 63.

When the pad 3 is released, supply of air from the sponge 52 is stopped. Accordingly, the piston 85 is moved by the force of the spring toward the bulkhead 81. As a result, the conductor 89 is separated from the terminals 87, 88. This deactivates the horn 80.

The steering wheel W according to this embodiment has the following advantages.

(1) The steering wheel W has a switch (the terminals 87, 88 and the conductor 89), which is actuated by the pressure of air sent from the sponge 52. The sponge 52 and the bag 53 for accommodating the sponge 52 are made of material that is hardly deformed by temperature changes. Therefore, even if the sponge and the bag 53 are deformed by temperature changes, the speed of the deformation will not be fast enough to produce pressure that moves the piston 85. Thus, the switching means of this embodiment tolerates temperature changes better than the prior art membrane switch, which includes thin metal plates. That is, the switch of this embodiment functions normally when the ambient temperature changes. In this manner, this embodiment reduces erroneous operations of the horn 63.

(2) The sponge 52 and the bag 53 for supplying air to the casing 80 are made of inexpensive material. Therefore, the cost of the steering wheel W is reduced.

(3) Even if the sponge 52 and the bag 53 are deformed when located between the pad 3 and the air bag 14, air is not supplied to the casing 80 unless the pad 3 is pressed. The clearance between the pad 3 and the air bag 14 has larger tolerance than when the prior art membrane switch is used. That is, the clearance does not need to be precise as when the membrane switch is used. As a result, the design of the steering wheel W is more flexible and the assembly of the steering wheel W is easier. Consequently, the manufacturing cost of the steering wheel W is lowered.

(4) This embodiment significantly reduces the number of parts for the switch compared to a prior art membrane switch. This further reduces the manufacturing cost of the steering wheel W.

It should be apparent to those skilled in the art that the present invention may be embodied in many other specific forms without departing from the spirit or scope of the invention. Particularly, it should be understood that the invention may be embodied in the following forms.

(1) In the first embodiment, the coupling plate 8b of the boss 8 may be made with an iron based metal instead of with aluminum alloy. In this case, the bushing holes 45 of the ribs 44 can directly be threaded. This eliminates the need for of the bushings 47 having the threaded portions 47c. Accordingly, the number of parts in the steering wheel W is reduced.

(2) In the first embodiment, the connecting member 11 is tightly held by ribs 44 of the boss 8. However, ribs may be formed on the connecting member 11 and the boss 8 may be formed without the ribs 44. In this case, the boss 8 is tightly held between the ribs formed on the connecting member 11.

(3) The connecting member 11 may be secured to the boss 8 by more than two bolts 41.

(4) The present invention may be embodied in steering wheels of different designs such as a steering wheel having two spokes or in a steering wheel having five or more spokes.

(5) The material of the spoke core 6 is not limited to aluminum alloys. Other light metals, such as magnesium, may be used in lieu of aluminum alloys. Iron-based metals are used as the material for various members in the present invention. Such metals include hot rolled mild steel sheet (as classified in Japanese Industrial Standard (JIS) G3131), cold rolled steel sheet (as classified in JIS G3141), and electrolytic zinc-coated carbon steel sheet (as classified in JIS G3313).

(6) In the illustrated embodiments, every adjacent pair of the spoke cores 6 are coupled to each other by the coupling cores 10A–10D. However, only part of the cores 6 may be coupled by coupling cores. For example, only two of the spoke cores 6 may be coupled to each other by a coupling core.

(7) The projection 11b formed on the bottom of the connecting member 11 may be omitted in the illustrated embodiments.

(8) In the illustrated embodiments, the bushings 47 have threaded holes. Alternatively, nuts may be used for securing bolts 41.

(9) In addition to the protrusions 20, other protrusions may be integrally formed on the boss 8 for positioning the connecting member 11 on the boss 8.

(10) The size of the hole 11a may be reduced such that it only accommodates the distal end of the steering shaft 30 and the nut 34. In this case, two other holes are formed to engage with the protrusions 20. Alternatively, recesses may be formed in the bottom of the connecting member 11 to engage with the protrusions 20.

(11) A normally open type switch, in which the terminals 87 and 88 are electrically connected for activating the horn circuit 62, is used in the fourth embodiment. However, a normally closed type switch in which the terminals 87 and 88 are separated for activating the horn circuit 62 may be employed.

(12) In the fourth embodiment, the sponge 52 for sending air to the casing 80 may be replaced with a rubber balloon.

(13) The air bag device 13 may be replaced with other types of impact absorbing devices.

Therefore, the present examples and embodiments are to be considered as illustrative and not restrictive and the invention is not to be limited to the details given herein, but may be modified within the scope and equivalence of the appended claims.

What is claimed is:

1. A steering wheel mountable on a steering shaft with a boss plate, the steering wheel having a gripping ring configured for manually turning the steering shaft, the steering wheel comprising:
    a ring core embedded in the gripping ring;
    a plurality of spokes extending in the ring core;
    a plurality of spoke cores respectively embedded in the spokes;
    a connecting member for connecting at least two spoke cores together;
    a cover for covering the ring core and the spoke cores;
    a pad positioned substantially at a center of the gripping ring;
    a coupling mechanism for coupling the boss plate to the connecting member, the coupling mechanism including an inner coupling member and an outer coupling member, wherein the inner coupling member is fixed to one of the boss plate and the connecting member, and the outer coupling member is fixed to the other, wherein the outer coupling member has a first end and a second end opposite to the first end, wherein the inner coupling member has a pair of parallel bores, and wherein the coupling mechanism includes a pair of bolts; and
    a pair of spaced ribs formed on the outer coupling member for holding the inner coupling member, wherein the inner coupling member fits between the ribs when the coupling mechanism is coupled;
    wherein the pair of spaced ribs is a first pair of at least two pairs of spaced ribs, the first pair of spaced ribs being located adjacent to the first end of the outer coupling member;
    wherein a second pair of spaced ribs is located adjacent to the second end of the outer coupling member, each rib of the first and second pair of spaced ribs having a hole formed therethrough;
    wherein a first hole of each pair of spaced ribs is formed in alignment with the other hole of the same pair; and
    wherein each bolt, of the pair of bolts is inserted through the holes of a corresponding pair of spaced ribs and through a corresponding one of the parallel bores.

2. The steering wheel according to claim 1, wherein the coupling mechanism includes:
    a collar located in each of the parallel bores;
    a pair of first bushings, each having a center hole, wherein each first bushing is configured to be located in one end of one of the parallel bores, respectively; and
    a pair of second bushings having an inner female thread for engaging matching threads on the bolts, wherein the second bushings are configured to be located in the opposite ends of the parallel bores, respectively, wherein the bolts are received by the collars and the bushings, respectively.

3. The steering wheel according to claim 2, wherein each bolt extends in a direction that is transverse to the axis of the steering wheel, and wherein each bolt is laterally spaced from the axis of the steering wheel.

4. The steering wheel according to claim 3, wherein the bolts are located on opposite sides of the axis of the steering wheel, and the steering shaft is located at the center of the coupling mechanism.

5. The steering wheel according to claim 1, wherein the coupling mechanism includes a collar inserted into each bore of the inner coupling member, and wherein the coupling mechanism further includes a pair bushings, each having a female inner thread for engaging matching threads on the bolts, wherein each bushing is configured to be inserted into one end of a corresponding one of the parallel bores.

6. The steering wheel according to claim 5, wherein the collar is more rigid than the material forming the inner coupling member.

7. The steering wheel according to claim 6, wherein each rib is made of a light metal, and the collar and each bushing are made of an iron-based metal.

8. The steering wheel according to claim 7, wherein each rib is made of an aluminum-based material.

9. A steering wheel mountable on a steering shaft with a boss plate, the steering wheel having a gripping ring configured for manually turning the steering shaft, the steering wheel comprising:

a ring core embedded in the gripping ring;

a plurality of spokes extending in the ring core;

a plurality of spoke cores respectively embedded in the spokes;

a connecting member for connecting at least two spoke cores together;

a cover for covering the ring core and the spoke cores;

a pad positioned substantially at a center of the gripping ring;

a coupling mechanism for coupling the boss plate to the connecting member, the coupling mechanism including a first coupling member and a second coupling member, wherein the first coupling member is fixed to one of the boss plate and the connecting member, and the second coupling member is fixed to the other, and wherein the first and second coupling members are mated to couple the steering wheel to the boss plate;

a protrusion formed on the first coupling member; and a receptacle formed on the second coupling member to receive the protrusion when the coupling mechanism is coupled to accurately position the first coupling member in a fixed relationship with respect to the second coupling member;

wherein (i) the protrusion has an outer surface and (ii) the receptacle is formed of a hole having an inner surface for engaging the outer surface; and wherein the first coupling member has two protrusions, the hole surrounding the two protrusions when the coupling mechanism is coupled.

10. The steering wheel according to claim 9, wherein the first coupling member is configured to be connected to the boss plate, and wherein the protrusions each have a female thread used for receiving a tool for removing the boss plate from the steering shaft.

11. The steering wheel according to claim 9, wherein one of the first and second coupling members is an outer coupling member, and the other is an inner coupling member, wherein a pair of spaced ribs is formed on the outer coupling member for holding the inner coupling member, wherein the inner coupling member fits between the ribs when the coupling mechanism is coupled, and wherein a fastener fastens the inner coupling member to the ribs of the outer coupling member to secure the coupling mechanism.

12. The steering wheel according to claim 11, wherein the outer coupling member has a first end and a second end opposite to the first end, and wherein the pair of spaced ribs is a first pair of two pairs of ribs, and wherein the first pair of ribs is located adjacent to the first end, and wherein a second pair of ribs is located adjacent to the second end.

13. The steering wheel according to claim 12, wherein the inner coupling member has a pair of parallel bores, and the ribs each have a hole formed in alignment with the hole of the other rib of the same pair, wherein the coupling mechanism includes a pair of bolts, wherein each bolt is configured to be inserted through the holes of a corresponding pair of ribs and through a corresponding one of the parallel bores.

14. The steering wheel according to claim 13, wherein the coupling mechanism includes a collar inserted into each bore of the inner coupling member, and wherein the coupling mechanism further includes a pair bushings, each having a female inner thread for engaging matching threads on the bolts, wherein each bushing is configured to be inserted into one end of a corresponding one of the parallel bores.

15. The steering wheel according to claim 13, wherein the bolts are located on opposite sides of the axis of the steering wheel, and the axis of the steering shaft is located at the center of the coupling mechanism.

\* \* \* \* \*